Oct. 30, 1951  H. M. OLSON  2,573,049
PREPARATION OF METAL-ORGANIC COMPOUNDS
Filed Aug. 31, 1950
Fig.1
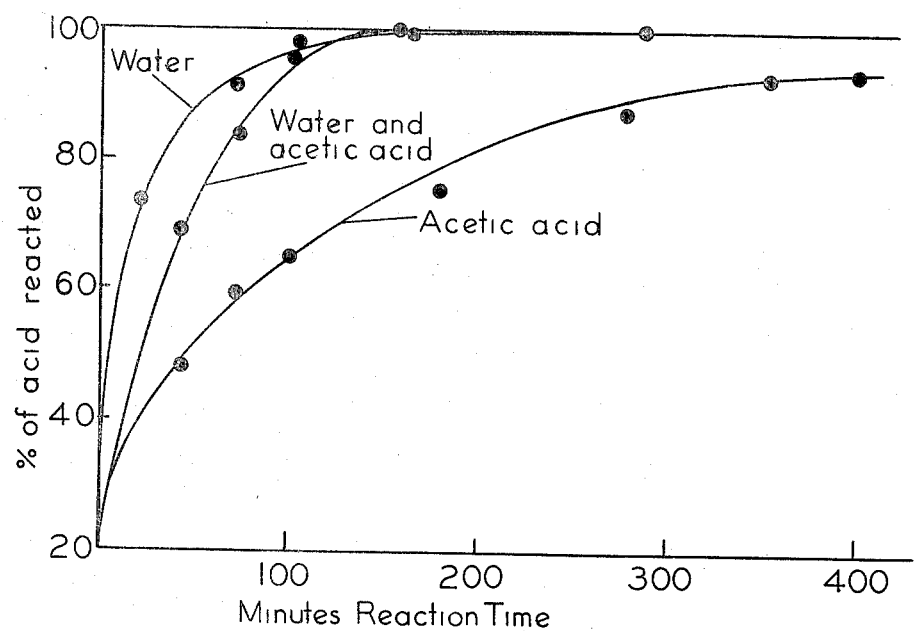
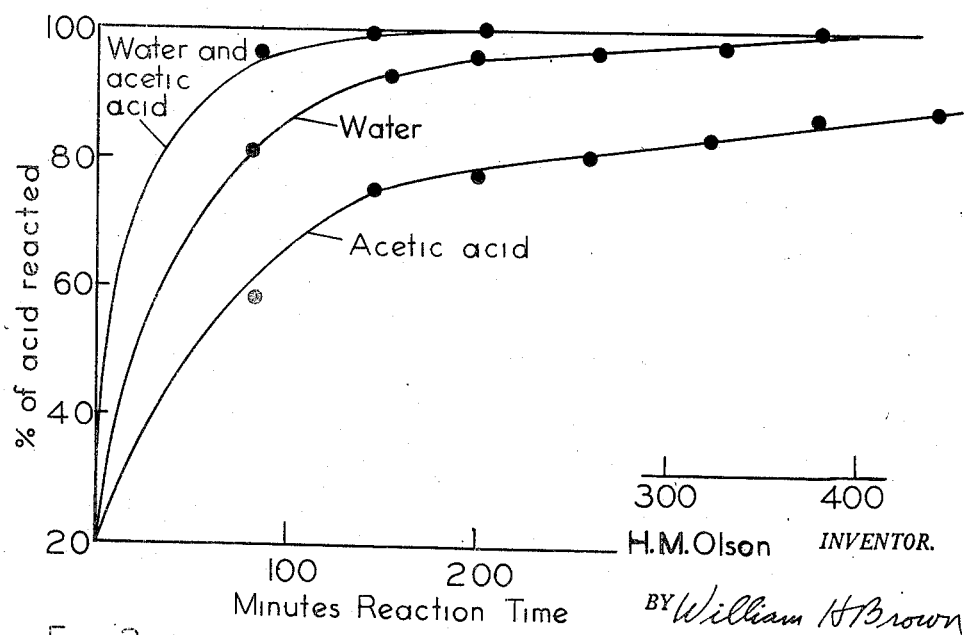
Fig. 2
H. M. Olson  INVENTOR.
BY William H Brown
Atty.

Patented Oct. 30, 1951

2,573,049

UNITED STATES PATENT OFFICE 2,573,049

PREPARATION OF METAL-ORGANIC COMPOUNDS

Harold M. Olson, Vermillion, Ohio, assignor to The Harshaw Chemical Company, Elyria, Ohio, a corporation of Ohio Application August 31, 1950, Serial No. 182,599

7 Claims. (Cl. 260—97.5)

This invention relates to manufacture of metal-organic compounds by direct reaction between a carboxylic acid and the metal in the metallic state.

This application is a continuation-in-part of my co-pending application Serial No. 765,637 filed August 1, 1947, now abandoned.

Prior to my invention it was known that such reactions would occur simply by bringing together the acid and the metal, but the reactions did not go to completion and the rate was too slow for practical results. The ordinary means for increasing reaction rates did not accelerate these reactions to a sufficient degree. U. S. Patents 2,395,397 and 2,397,767 disclose processes by means of which it is proposed to solve the problem by blowing the reaction with air, presumably to form oxide at the surface of the metal which would easily react with the acid. This was found to be unsuitable for the production of siccatives and allied products inasmuch as the product was dark and sludged badly, evidently due to the formation of oxidation products.

I have now discovered that certain metals in the metallic state can be reacted with organic acids at a satisfactory rate, and to a satisfactory degree of completion, by carrying out the reaction in the presence of water, or water plus lower aliphatic acids.

In the accompanying drawings, Fig. 1 is a graphic representation of the reaction rates in the cases of 2-ethyl hexoic acid employing as catalyst: water, a mixture of water and acetic acid, and acetic acid alone; and Fig. 2 is a similar graph representing reaction rates in the case of naphthenic acid, the metal being manganese in both cases.

The metals referred to are manganese, magnesium, and calcium.

The organic acids referred to are aliphatic and alicyclic organic acids having from 8 to 22 carbon atoms in the molecule. The monocarboxylic acids are preferred. The specific commercial materials which we consider most suitable for our process are naphthenic acid and the higher fatty acids having from 8 to 22 carbon atoms in the molecule such as stearic acid, palmitic acid, oleic acid, and 2-ethyl hexoic acid. The list may also include tall oil, tall oil acids, rosin, rosin acids, and other commerical mixtures of acids such as those derived from fish oil, corn oil, cocoanut oil, linseed oil, castor oil, and cottonseed oil. These mixtures are made up entirely, or almost entirely, of acids having from 8 to 22 carbon atoms.

The lower aliphatic acids referred to are formic, acetic, chloracetic, propionic, chloropropionic, oxalic, citric, and tartaric acids.

In the practice of the invention the metal in the form of powder, granules, wire, shavings or the like is brought into contact with (1) the high molecular weight organic acid, or a mixture of such high molecular weight acids, and (2) a small proportion of water, or the low molecular weight acid or, preferably, a mixture of water and the low molecular weight acid. The weights of the metal and the high molecular weight acid may be calculated to stoichiometric proportions, or there may be an excess of the metal or a small excess of the acid. The low molecular weight acid is most desirably employed in relatively low proportions, e. g. from ½% to 5% based upon the weight of the high molecular weight acid. Water is most desirably present to the extent of from ½% to 5% of the weight of the high molecular weight acid and, if both catalytic acid and water are used, they may be present, taken together, to the extent of from ½% to 10% of the weight of the high molecular weight acid. These are merely optimum proportions and larger proportions may be used. It is not desirable to use more than 10% of catalyst since greater proportions reduce reactivity, and increase the problem of removal of catalyst from the product. Oxidizing gases are not only unnecessary but are actually objectionable. Inert or reducing gases may be employed either by bubbling the same through the reaction mixture, or using such gases to replace the air in the reaction vessel.

The metal may be in excess of the molecular equivalent of the high molecular weight acid by any amount since the excess at the end of the reaction may be filtered off. If the metal is in a finely divided state which gives faster reaction and is, therefore, desirable, the excess need not be great; but in order to get a high reaction rate in the case where the metal is not finely divided, a greater excess is used. In the case of 200 mesh metal an excess of ¼ mol of metal per mol of high molecular weight acid is satisfactory from the standpoint of reaction rate.

The temperature of the reaction may be suitably from 100° C. to 160° C. but preferably should be from 130° C. to 145° C.

In some cases the reaction carried out in the presence of an excess of metal results in a basic compound. This may be desirable but, if it is not, the basic compound may be reacted with additional calculated quantities of siccative acid to give a neutral product.

The following specific examples will serve to illustrate the invention:

Example I

To 200 grams of 2-ethyl hexoic acid were added 38.5 grams of manganese metal in the form of 100 mesh powder, 5 grams of distilled water, and 325 grams of mineral spirits. The mixture was refluxed at a temperature of approximately 130°

C. to 135° C. for the periods of time as indicated in the following table:

| Sample | Reaction Time (Minutes) | Acid Number | Per Cent Reaction |
|---|---|---|---|
| 22-1 | 0 | +143.6 | 0 |
| 22-2 | 43 | +38.1 | 73.5 |
| 22-3 | 72 | +12.3 | 91.5 |
| 22-4 | 105 | +2.9 | 98.0 |
| 22-5 | 165 | +0.5 | 99.6 |
| 22-6 | 291 | −0.3 | 100+ |

Example II

To 200 grams of 2-ethyl hexoic acid were added 38.5 grams of manganese metal in the form of 100 mesh powder, 2.5 grams of distilled water, 2.5 grams of glacial acetic acid, and 325 grams of mineral spirits. The mixture was refluxed at a temperature of approximately 130° C. to 135° C. for the periods of time and with the results as indicated in the following table:

| Sample | Reaction Time (Minutes) | Acid Number | Per Cent Reaction |
|---|---|---|---|
| 23-1 | 0 | +146.2 | 0 |
| 23-2 | 43 | +45.5 | 69 |
| 23-3 | 73 | +23.5 | 84 |
| 23-4 | 103 | +7.1 | 95.4 |
| 23-5 | 196 | −2.3 | 100+ |
| 23-6 | 286 | −2.2 | 100+ |

Example III

To 200 grams of 2-ethyl hexoic acid were added 38.5 grams of 100 mesh manganese metal, 5 grams of glacial acetic acid, and 325 grams of mineral spirits. The mixture was refluxed at a temperature of approximately 130° C. to 135° C. for the times and with the results as indicated in the following table:

| Sample | Reaction Time (Minutes) | Acid Number | Per Cent Reaction |
|---|---|---|---|
| 21-1 | 0 | +149.2 | 0 |
| 21-2 | 44 | +76.6 | 48.6 |
| 21-3 | 72 | +60.7 | 59.4 |
| 21-4 | 100 | +51.5 | 65.5 |
| 21-5 | 160 | +37.1 | 75.2 |
| 21-6 | 280 | +19.3 | 87.2 |
| 21-7 | 354 | +10.5 | 93.0 |
| 21-8 | 402 | +9.4 | 93.8 |

Example IV

To 200 grams of refined naphthenic acid of acid value 238.3 were added 24 grams of manganese metal in the form of 100 mesh powder, 2.5 grams of distilled water, 2.5 grams of glacial acetic acid, and 135 grams of mineral spirits. The resulting mixture was refluxed at a temperature from 134° C. to 145° C. for the periods and with the results as indicated in the following table:

| Sample | Reaction Time (Minutes) | Acid Number | Per Cent Reaction |
|---|---|---|---|
| 20-1 | 0 | +147.2 | 0 |
| 20-2 | 86 | +5.6 | 96.2 |
| 20-3 | 145 | +0.6 | 99.6 |
| 20-4 | 205 | −1.1 | 100+ |
| 20-5 | 263 | −2.3 | 100+ |

Example V

To 200 grams of refined naphthenic acid of acid value 238.3 were added 24 grams of manganese metal in the form of 100 mesh powder, 5 grams of distilled water, and 135 grams of mineral spirits. The resulting mixture was refluxed at temperatures from 136° C. to 142° C. for the times and with the results as indicated in the following table:

| Sample | Reaction Time (Minutes) | Acid Number | Per Cent Reaction |
|---|---|---|---|
| 19-1 | 0 | +142.0 | 0 |
| 19-2 | 82 | +26.1 | 81.6 |
| 19-3 | 140 | +10.7 | 92.5 |
| 19-4 | 199 | +5.7 | 96.0 |
| 19-5 | 263 | +4.8 | 96.6 |
| 19-6 | 331 | +4.0 | 97.2 |
| 19-7 | 384 | −0.7 | 100+ |
| 19-8 | 446 | −1.5 | 100+ |

Example VI

To 200 grams of refined naphthenic acid of acid value 238.3 were added 24 grams of manganese metal in the form of 100 mesh powder, 5 grams of glacial acetic acid, and 135 grams of mineral spirits. The resulting mixture was refluxed in the temperature range from 130° C. to 140° C. for the times and with the results as indicated in the following table:

| Sample | Reaction Time (Minutes) | Acid Number | Per Cent Reaction |
|---|---|---|---|
| 21-1 | 0 | +152.7 | 0 |
| 21-2 | 83 | +63.8 | 58.2 |
| 21-3 | 144 | +37.6 | 75.4 |
| 21-4 | 201 | +33.9 | 77.8 |
| 21-5 | 259 | +29.4 | 80.7 |
| 21-6 | 322 | +25.4 | 83.4 |
| 21-7 | 380 | +21.1 | 86.2 |
| 21-8 | 443 | +19.8 | 87.0 |

Example VII

To 200 grams of tall oil were added 20 grams of manganese in the form of 100 mesh powder, 2½ grams of acetic acid, 2½ grams of water, and 200 grams of mineral spirits. The mixture was refluxed for 4 hours at from 135° C. to 140° C. The resulting manganese tall oil soap solution, after distilling off the water, contained 59.1% solids at 105° C., analyzed 4.82% of manganese, and had an acid value of minus 11.8.

Example VIII

To 200 grams of naphthenic acid of acid value 244 were added 10 grams of magnesium turnings, 5 grams of water, 5 grams of glacial acetic acid, and 125 grams mineral spirits. The mixture was refluxed for 6 hours at from 135° C. to 140° C. after which the water was removed by vacuum distillation. The product, a solution of magnesium naphthenate, contained 2.9% Mg., had an acid value of plus 16.4, and contained 62.9% solids at 105° C.

Example IX

To 200 grams of linseed fatty acids were added 12 grams of calcium metal in the form of turnings, 2½ grams of glacial acetic acid, 2½ grams of water, 165 grams mineral spirits, and 20 grams Cellosolve to reduce viscosity. The mixture was refluxed for 6 hours at from 135° C. to 140° C. The water was then distilled off under vacuum, and the final product, a solution of calcium linoleate in mineral spirits, was filtered. It analyzed 2.87% of calcium and the acid value was plus 19.4. It contained 56.9% solids at 105° C.

Example X

To 200 grams of gum rosin were added 20 grams of manganese metal in the form of 100 mesh powder, 5 grams water, 5 grams acetic acid, and 500 grams toluol. The mixture was refluxed for 6 hours at 112°–115° C. after which it was filtered and the moisture and toluol were stripped off under vacuum. A solid material containing 8.75% Mn. was obtained.

Having thus described my invention, what I claim is:

1. In the manufacture of compounds of metals of the class consisting of manganese, magnesium, and calcium, the steps of reacting together in the temperature range from 100° C. to 160° C., metal in the metallic state and a high molecular weight, organic monocarboxylic acid of the class consisting of aliphatic, alicyclic, rosin, and tall oil acids having from 8 to 22 carbon atoms in the molecule, the metal being present in excess of the amount required to react with said acid, and the reaction being carried out in the presence of a catalyst of the class consisting of water, and a mixture of water with a low molecular weight organic acid of the class consisting of formic, acetic, propionic, oxalic, citric, and tartaric acids.

2. In the manufacture of compounds of metals of the class consisting of manganese, magnesium, and calcium, the steps of reacting together in the temperature range from 100° C. to 160° C., metal in the metallic state and a high molecular weight, organic monocarboxylic acid of the class consisting of aliphatic, alicyclic, rosin, and tall oil acids having from 8 to 22 carbon atoms in the molecule, the metal being present in excess of the amount required to react with said acid, and the reaction being carried out in the presence of a catalyst of the class consisting of water, and a mixture of water with a low molecular weight organic acid of the class consisting of formic, acetic, propionic, oxalic, citric, and tartaric acids, each of said catalysts being employed in quantity within the range from ½% to 5% based on the weight of said high molecular weight organic acid.

3. A process according to claim 2 wherein said metal is manganese, and said monocarboxylic acid is naphthenic acid.

4. A process according to claim 2 wherein said metal is manganese, and said monocarboxylic acid is 2-ethyl hexoic acid.

5. A process according to claim 2 wherein said metal is magnesium, and said monocarboxylic acid is naphthenic acid.

6. A process according to claim 2 wherein said metal is manganese, and said monocarboxylic acid is tall oil acid.

7. A process according to claim 2 wherein said metal is calcium, and said monocarboxylic acid is naphthenic acid.

HAROLD M. OLSON.

No references cited.